US010803028B2

(12) United States Patent
Eluri et al.

(10) Patent No.: US 10,803,028 B2
(45) Date of Patent: Oct. 13, 2020

(54) MULTIPHASE APPROACH TO DATA AVAILABILITY

(75) Inventors: Amarnadh Sai Eluri, Magarpatta (IN); Sasikanth Simhachala Gottapu, Magarpatta (IN)

(73) Assignee: SYBASE, INC., Dublin, CA (US)

( * ) Notice: Subject to any disclaimer, the term of this patent is extended or adjusted under 35 U.S.C. 154(b) by 65 days.

(21) Appl. No.: 13/332,465

(22) Filed: Dec. 21, 2011

(65) Prior Publication Data

US 2013/0166508 A1   Jun. 27, 2013

(51) Int. Cl.
  G06F 7/00     (2006.01)
  G06F 16/21    (2019.01)
(52) U.S. Cl.
  CPC .................... G06F 16/21 (2019.01)
(58) Field of Classification Search
  CPC .... G06F 17/30575; G06F 16/21; G06F 16/22; G06F 16/31; G06F 16/41; G06F 16/61; G06F 16/71
  USPC ................ 707/609, 634, 655, 803, 711, 741
  See application file for complete search history.

(56) References Cited

U.S. PATENT DOCUMENTS

| | | | | |
|---|---|---|---|---|
| 6,523,036 B1* | 2/2003 | Hickman | ................ | G06F 16/27 707/704 |
| 7,177,859 B2* | 2/2007 | Pather | .................... | G06F 9/542 707/707 |
| 7,599,908 B2* | 10/2009 | Bresch | ................ | G06F 16/2343 707/707 |
| 8,127,308 B1* | 2/2012 | Laura | ........................ | G06F 9/52 718/100 |
| 8,621,161 B1* | 12/2013 | Briggs | .................... | G06F 16/27 711/152 |
| 8,694,455 B2* | 4/2014 | Eder | ...................... | G06Q 40/00 706/45 |
| 2004/0172408 A1 | 9/2004 | Klosterhalfen et al. | | |
| 2005/0182799 A1 | 8/2005 | Hitz et al. | | |
| 2005/0289550 A1* | 12/2005 | Blackmore | ............. | G06F 9/526 718/102 |
| 2006/0190497 A1* | 8/2006 | Inturi | .................... | G06F 16/213 707/707 |
| 2007/0239751 A1* | 10/2007 | Wei | ...................... | G06F 16/2379 707/707 |
| 2008/0052320 A1 | 2/2008 | Lee et al. | | |
| 2008/0091743 A1 | 4/2008 | Goff | | |
| 2009/0037495 A1* | 2/2009 | Kumar | .............. | G06F 16/24552 707/707 |
| 2009/0055448 A1* | 2/2009 | Beier | .................. | G06F 16/2282 707/707 |

(Continued)

OTHER PUBLICATIONS

Notification of Transmittal of the International Search Report and the Written Opinion of the International Searching Authority, or the Declaration, of International Application No. PCT/US2012/070616, dated Apr. 25, 2013, 9 pages.

(Continued)

*Primary Examiner* — Alexandria Y Bromell
(74) *Attorney, Agent, or Firm* — Sterne, Kessler, Goldstein & Fox P.L.L.C.

(57) ABSTRACT

Embodiments include a method, apparatus and computer program product for providing access to a database data source during database maintenance. The method includes initiating maintenance of the database data source and managing the database maintenance to allow concurrent access to the database data source.

14 Claims, 10 Drawing Sheets

(56) References Cited

U.S. PATENT DOCUMENTS

| | | | | |
|---|---|---|---|---|
| 2010/0241848 | A1* | 9/2010 | Smith | H04L 63/0442 713/153 |
| 2010/0262590 | A1* | 10/2010 | Holt | G06F 8/456 707/704 |
| 2011/0022576 | A1* | 1/2011 | Gaertner | G06F 16/22 707/704 |
| 2011/0246419 | A1* | 10/2011 | Yancey et al. | 707/624 |
| 2011/0302506 | A1* | 12/2011 | Noyes | G06Q 10/101 715/753 |
| 2012/0042301 | A1* | 2/2012 | Grechanik | G06F 8/35 717/124 |
| 2012/0297005 | A1* | 11/2012 | Langouev | G06F 9/466 709/207 |
| 2013/0061155 | A1* | 3/2013 | Hon | G06F 16/44 715/753 |
| 2013/0132443 | A1* | 5/2013 | Hart | G06F 16/2365 707/803 |

OTHER PUBLICATIONS

"77 DBMS_Redefinition," Oracle Database PL/SQL Packages and Types Reference 10g Release 2 (10.2), from http://download.oracle.com/docs/cd/B19306_01/appdev.102/b14258/d_redefi.htm, as archived Mar. 24, 2010 on the Wayback Machine at http://web.archive.org, 8 pages.

"How Online Index Operations Work" from http://msdn.microsoft.com/en-us/library/ms191261, as archived Sep. 18, 2012 on the Wayback Machine at http://web.archive.org, 4 pages.

Lawson, C. et al., "Don't Shut Down That Database! Use Oracle 9i Online Object Redefintion Instead," from http://www.dbspecialists.com/files/presentations/online_redef.html, as archived Jan. 26, 2009 on the Wayback Machine at http://web.archive.org, 12 pages.

\* cited by examiner

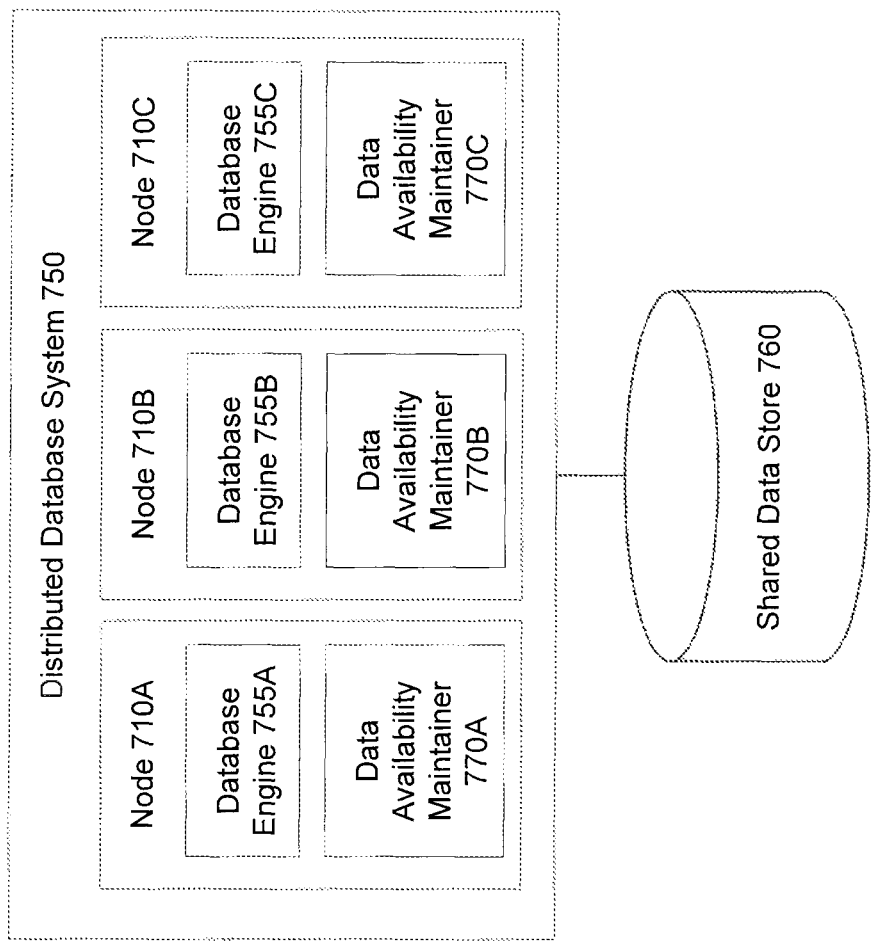

800

```
A method of providing access to a database data
source during database maintenance.
           │
           ▼
Create a data structure based on a first set of data    ─ 810
that is locked.
           │
           ▼
While the first set of data is unlocked and being first
modified by a database client, populate the data        ─ 820
structure with data from the first set of data, the
populating resulting in a second set of data.
           │
           ▼
          End
```

FIG. 8

MULTIPHASE APPROACH TO DATA AVAILABILITY

FIELD OF THE INVENTION

The present invention generally relates to database data availability.

BACKGROUND OF THE INVENTION

Computer applications increasingly rely on database systems. Modern database systems use different techniques to manage the storage and maintenance of large amounts of data. Databases may require the performance of maintenance operations to maintain successful operations. Performing maintenance operations on database system data can be challenging, especially when the database system is operating in a "production" mode, i.e., serving database clients with data operations. Database execution structures, such as transactions, can add additional challenges.

Different techniques exist for performing maintenance on production database systems. While these techniques can enable successful database maintenance operations, they can also lead to significant offline time for parts of the database and other database performance problems.

BRIEF SUMMARY

Embodiments of the present invention relate to database data availability. Specifically, embodiments provide a method, apparatus and computer program product for providing access to a database data source during database maintenance. The method includes initiating maintenance of the database data source and managing the database maintenance to allow concurrent access to the database data source.

Another embodiment includes a system having a data source and a node configured to maintain the data source. The node includes a structure copier configured to create a data structure based on a first data layer in the data source, the first data layer being locked. The node also includes a data copier configured to populate the data structure with data from the first data layer while the first data layer is unlocked and being first modified by a process. The populating of the data structure results in a second data layer. Finally, the node includes a data updater configured to, while the first data layer is unlocked and being second modified by the process, update the second data layer based on the first modifications made by the process. While the first data layer is locked, the data updater updates the second data layer based on the second modifications to the first data layer.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 7 shows a distributed database system having three nodes, according to an embodiment.

FIG. 8 shows a flowchart illustrating a method of providing access to a database data source, according to an embodiment of the present invention.

Figure 1A:
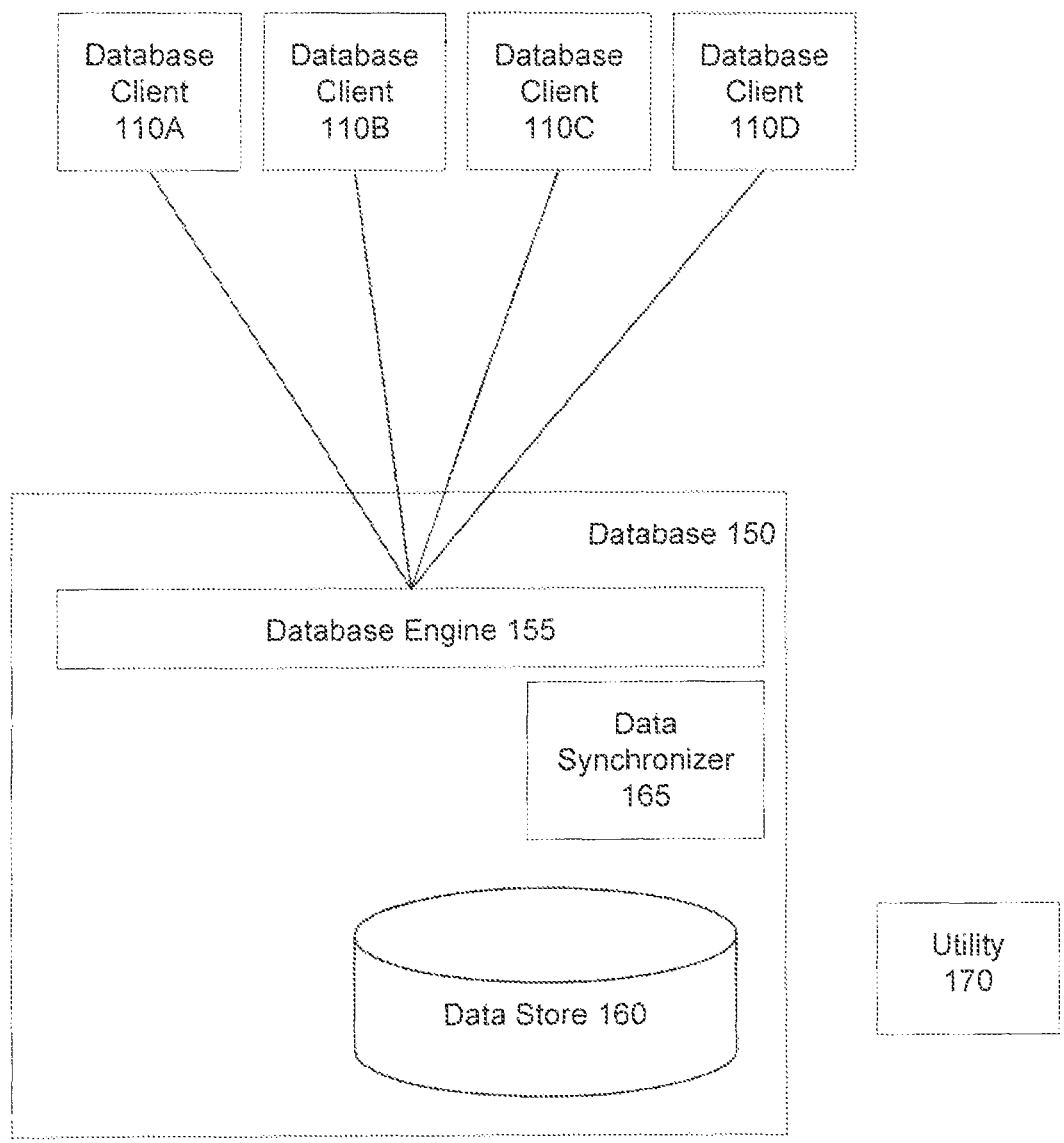
FIG. 1A shows a block diagram of a database system having a data synchronizer, according to an embodiment of the present invention.

The features and advantages of the present invention will become more apparent from the detailed description set forth below when taken in conjunction with the drawings.

DETAILED DESCRIPTION OF EMBODIMENTS

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and operation and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

OVERVIEW OF EMBODIMENTS

Demand for "24×7" data availability to support critical applications has led to shrinking maintenance windows for database systems. An embodiment described herein enables the improved use of utilities that have traditionally required portions of a database to be taken "offline" for relatively long periods of time. For example, a table processed by a traditional utility would need to be taken offline during all processing by the utility. By using a multiphase approach to data availability, "online" utility embodiments can enable required maintenance while reducing the amount of time that portions of the database are unavailable. As used typically herein, "database data" refers to portions of data in a database.

FIG. 1A is a block diagram of a database architecture 100, according to an embodiment. Database architecture 100 includes database clients 110A-D, database 150 and utility 170. Database 150 includes database engine 155, data synchronizer 165 and data store 160.

In an example, database 150 is a database that stores large amounts of data that serves a useful function to database clients 110A-D. For example and without limitation, an e-commerce application, such as an internet-based storefront, serves a large amount of clients and performs a critical function for the store owners.

In a conventional approach, performing different types of database maintenance functions using utility 170 requires the operation of database engine 155 to be suspended for clients 110A-D (also termed "taken offline"). In this conventional approach, access to database data to be acted upon is suspended, utility operations are performed on the data, and access is restored when the operations are completed.

In some conventional approaches, because the utility can only act on the data when processed database portions are offline, the amount of time the processed database portions must be taken offline is directly proportional to the amount of data upon which the utility is acting. For example, the more data in the conventionally processed system tables, the more data needs to be processed and the longer the database portions must be taken offline. In the e-commerce example noted above, because of the large amounts of data to be processed in data store 160, large amounts of data must be taken offline for an extended period of time.

Figure 1B:
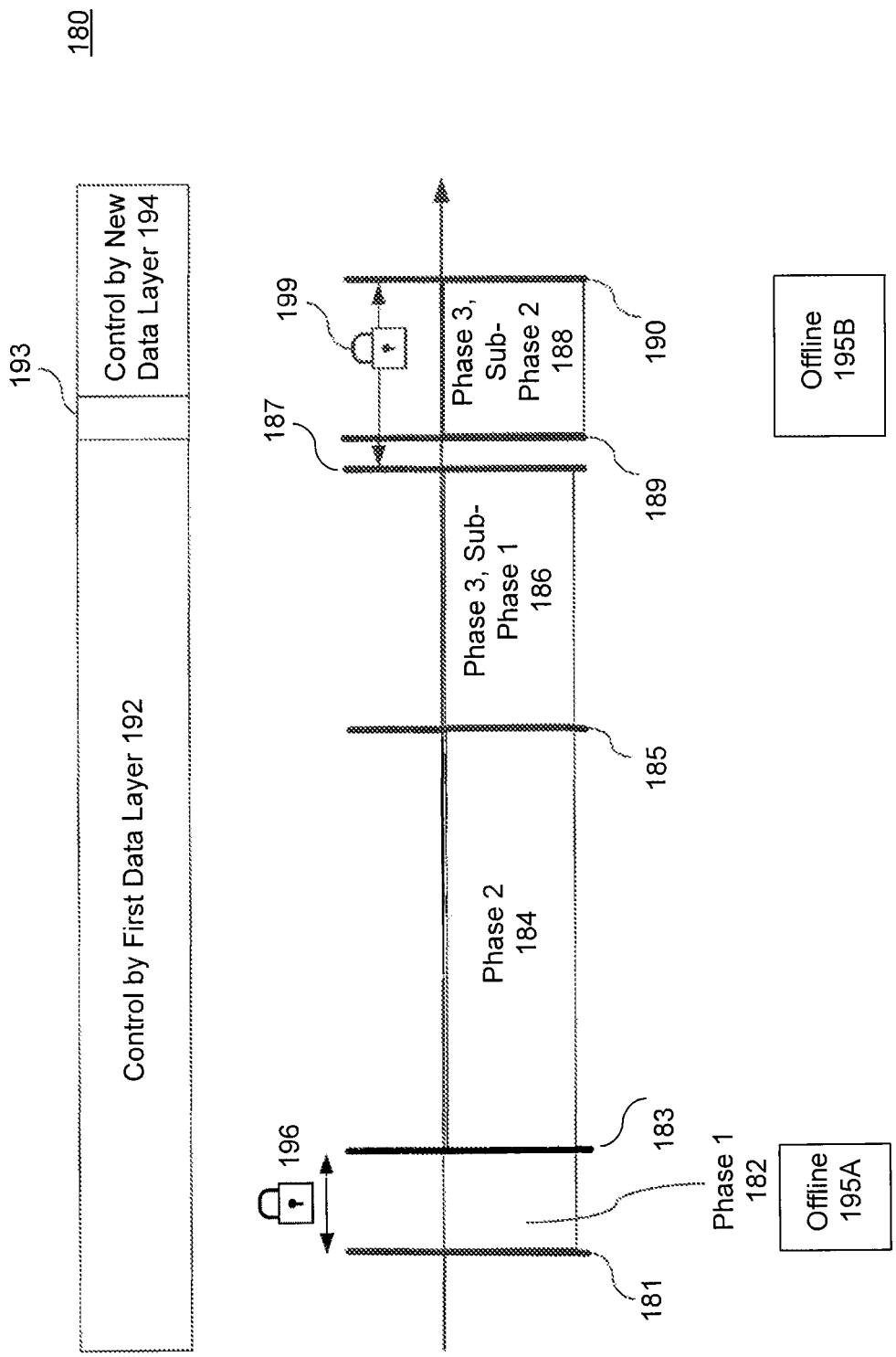
FIG. 1B shows a timeline that illustrates the progression of different phases of an embodiment.

FIG. 1B shows a timeline that illustrates the progression of different phases of an embodiment. Timeline 180 shows phase 1 (182), phase 2 (184), phase 3, sub-phase 1 (186), phase 3, sub-phase 2 (188). The beginning of phase 1 is shown at 181. The end of phase 1 is shown at 183. The end of phase 2 is shown at 185. The end of phase 3, sub-phase 1 is shown at 187. The end of phase 3, sub-phase 2 is shown at 190. It should be noted that the sizes of the phases shown on FIG. 1B are demarcated for convenience. Different implementation details may alter the proportions of the phases. For example, phase 1 (182) is typically a smaller proportion of the overall process than is shown on FIG. 1B.

On timeline 180, control by first data layer 192 shows the portion of the timeline where clients 110A-C connections are controlled by one data layer and control by new layer 194 shows the portion where clients 110A-C connections are controlled by a new data layer. Interval 193 on FIG. 1B shows the period of time used to modify system metadata to enable control by new data layer 194. Similarly, offline 195A-B show a portion of the timeline where an embodiment is offline to clients 110A-D. Locks 196 and 199 show a portion of the timeline where the controlling data layer is locked to client modifications.

FIG. 1B is referenced herein when describing FIGS. 2-6 below. In an embodiment, data synchronizer 165 enables a three phase approach to data availability for database clients 110A-D and utility 170. The following phases are discussed below: 1) phase 1 (182): data layer setup phase, (2) phase 2 (184): data layer copy phase, and (3) phase 3 (186, 188): logical synchronization phase.

It is important to note that FIG. 1B is intended to be an example timeline of different events associated with some embodiments. The timeline markers are intended to illustrate the operation of one embodiment, and should not be generalized to all embodiments described herein. As would be appreciated by one having skill in the relevant art(s), given the description herein, some events depicted on FIG. 1B can be executed in a different order than the one shown, and take different amounts of time to complete.

First Phase: Data Layer Setup Phase

Figure 2:
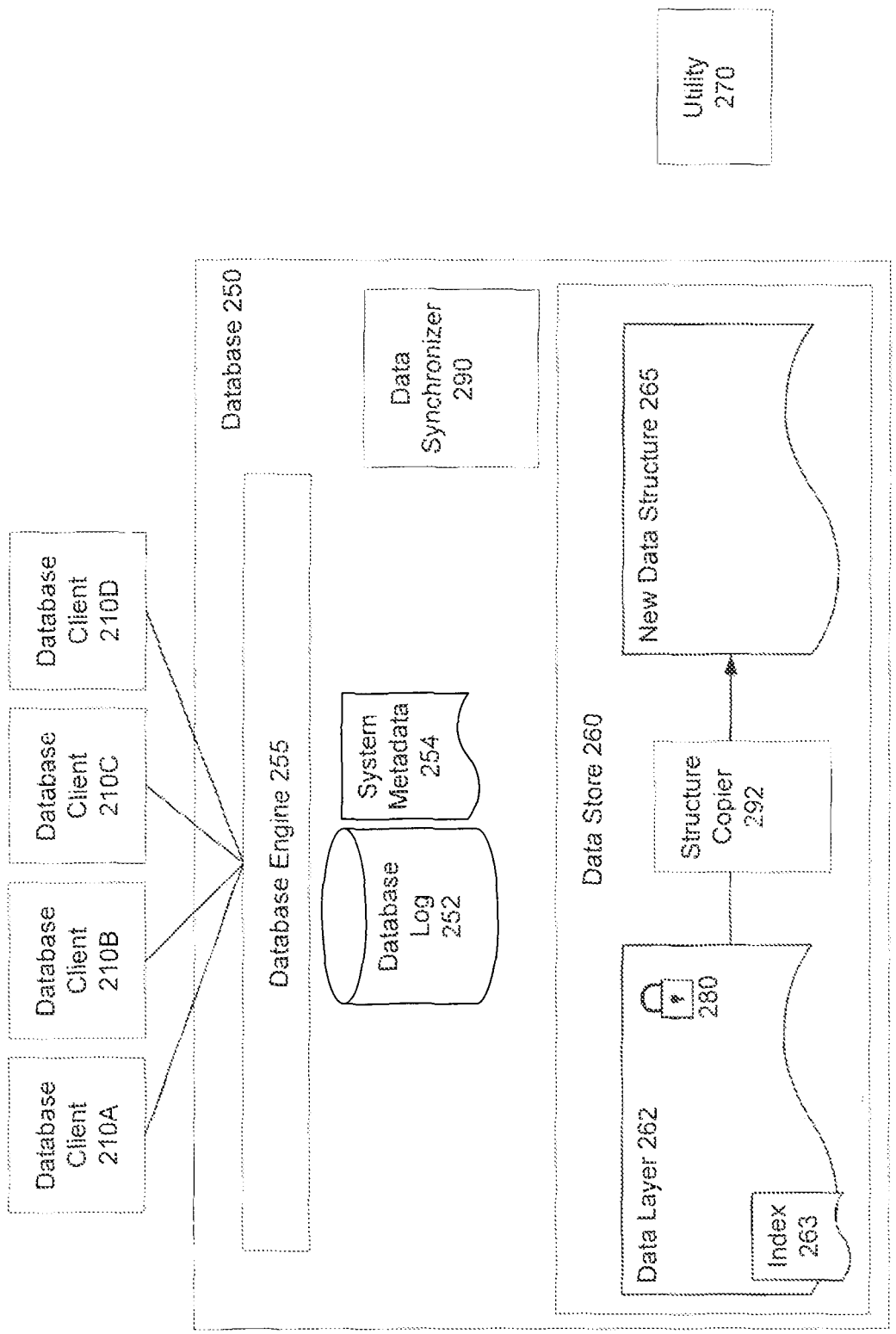
FIG. 2 shows a more detailed database system having a data synchronizer, a structure copier and a locked data layer, according to an embodiment.

FIG. 2 is a block diagram of a database architecture 200, according to an embodiment. Database architecture 200 includes database clients 210A-D, database 250 and utility 270. Database 250 includes database engine 255, data synchronizer 290, database log 252, system metadata 254 and data store 260. Data store 260 includes data layer 262, new data structure 265 and structure copier 292 coupled to both data layers. Data layer 262 has database index 263, and is subject to database lock 280. As used for some embodiments herein, data synchronizer 290 acts to coordinate the operation of different components to perform different functions. As would be appreciated by one having skill in the relevant art(s), given the description herein, different functions described herein can be coordinated in different ways other than using the single depicted data synchronizer 290. It is important to note for all figures described herein, that lines coupling different components are non-limiting and shown to illustrate an embodiment. Additional couplings can occur between components in embodiments beyond those depicted in figures.

In this example, discussed with the descriptions of FIGS. 2-6, utility 270 is sought to be used to modify a portion data store 260. Data layer 262 is to be modified by utility 270. An example function performed by utility 270 on data layer 262 is a function to insert a column with a default value in a table in data layer 262.

It is important to note that, as used herein, a "database layer" (also known as a "data layer") is used to represent a portion of data store 260. This database layer can comprise one or more database pages, objects and other logical database components. The actions discussed herein can be applied to these components as a part of a data layer. For example, a lock discussed herein can lock one or more database pages, tables and/or other database objects. Similarly, data copied from one database layer to another can be copied as one or more database pages and/or one or more database objects. In an example, an embodiment described herein uses database layers that include a single database table.

Database clients 210A-D also require access to data layer 262, and the administrators of database 250 seek to perform the functions of utility 270 with as little offline 195A-B time as possible.

To record the changes made to one layer for later integration into another layer, an embodiment uses database log 252. In an embodiment, markers are placed in the log at the beginning and end of the relevant phases. For example, after phase 1 is completed 183, a marker is placed in the database log before changes are made to the data source in unlocked phase 2 (184). At the end of phase 2 (185) another marker is placed in the database log.

As discussed below with the descriptions of FIGS. 3-5, phase 3 (186, 188) uses markers in database log 252 to update the new data layer based on new data structure 265 with changes made to data layer 262 during phase 2 (184) and phase 3, sub phase 1.

Placing a Lock

According to an embodiment, the first phase 182 begins when data synchronizer 290 places lock 280 (192 in FIG. 1B) on data layer 262. As would be appreciated by one having skill in the relevant art(s), given the description herein, a database lock is generally applied to a database object (e.g., a table), and prevents different functions from being performed on the database object. Locks can vary in the functions they prohibit, and the scope of the data to which the lock is applied. Phases that use locks to restrict access to data can also be termed "blocking phases."

One type of database lock is an exclusive table lock (EX_TAB). This lock is generally used to modify an entire table. An application task having this lock will get exclusive access to the table, e.g., no other reads from, or writes to, the table are permitted. Conventionally, commands that change the schema of the table (like 'create clustered index', and 'alter table add column') require this lock. In the example above, lock 280 is an EX_TAB lock on the table that makes up data layer 262.

Because of the exclusive nature of lock 280, while the lock is in place, database clients 210A-D are prevented from accessing the data in data layer 262. As is discussed with the description of FIG. 5 below, different types of locks can be used by some embodiments, including a lock with less scope, e.g., a "latch."

Creating a New Data Structure

Once data layer 262 is locked 192, the data structure required for the next phases can be created. New data structure 265 is created by structure copier 292 based on the structure of data layer 262 and a new system metadata is created as a handle for the new data layer 262, and the function to be performed by utility 270. As noted above, in this example, the function to be performed by utility 270 is the insertion of a column in a data layer 262 table. To enable this function, structure copier 292 creates new data structure 265 with the new column added that is visible only to utility 270.

It is important to note that, because only the structure and metadata of data layer 262 is copied during this first phase 182, the duration of this blocking phase is independent of the amount of data stored in data layer 262.

As discussed above, and as is described further with the descriptions of FIGS. 3-6 below, in addition to standard database modification activity, database log 252 holds "log markers" that denote specific events in the performance of different phases. In another embodiment, log markers are captured in separate "utility context structure." Having a utility context structure (not shown) store pointers to portions of database log 252 allows the marking of specific portions of database log 252 without changing database log 252. As used herein, "placing a log marker" can refer to either approach.

Because lock 280 is restricting access to data layer 262, during this phase 182 no log entries are added to database log 252 for both data layer 262 and new data structure 265.

The copying functions performed by structure copier 292 are not logged in database log 252.

To enable data updates to new data structure 265 in later phases during this phase a first log marker is placed in database log 252. This first log marker is used to mark the beginning of a first portion of database log 252. This first portion can be termed a "first log" by an embodiment.

In an embodiment, a timestamp tracker (not shown) is a temporary, partitioned work table having a schema with a timestamp and page number. An index exists on the timestamp tracker table on page number column to enable fast lookup of the page numbers during the timestamp comparison. This timestamp tracker table is created after releasing lock on the source table. The operation of this timestamp tracker is further discussed below.

Releasing the Lock

Once new data structure 265 is created by the first phase, data synchronizer 290 releases lock 280. At this point phase 1 (182) ends 183, and database clients 210A-D are able to access and perform some types of concurrent modifications to data layer 262. Types of concurrent activity supported by some embodiments include but are not limited to: reads (SELECT Statement), data manipulation language (DML) commands (INSERT/DELETE/UPDATE) and Set AUTO IDENTITY INSERT/AUTO IDENTITY UPDATE.

As would be appreciated by one having skill in the relevant art(s), given the description herein, once lock 280 is removed, modifications performed by database clients 210A-D are logged in the first marked portion of database log 252.

Second Phase: Data Layer Copy Phase

Figure 3:
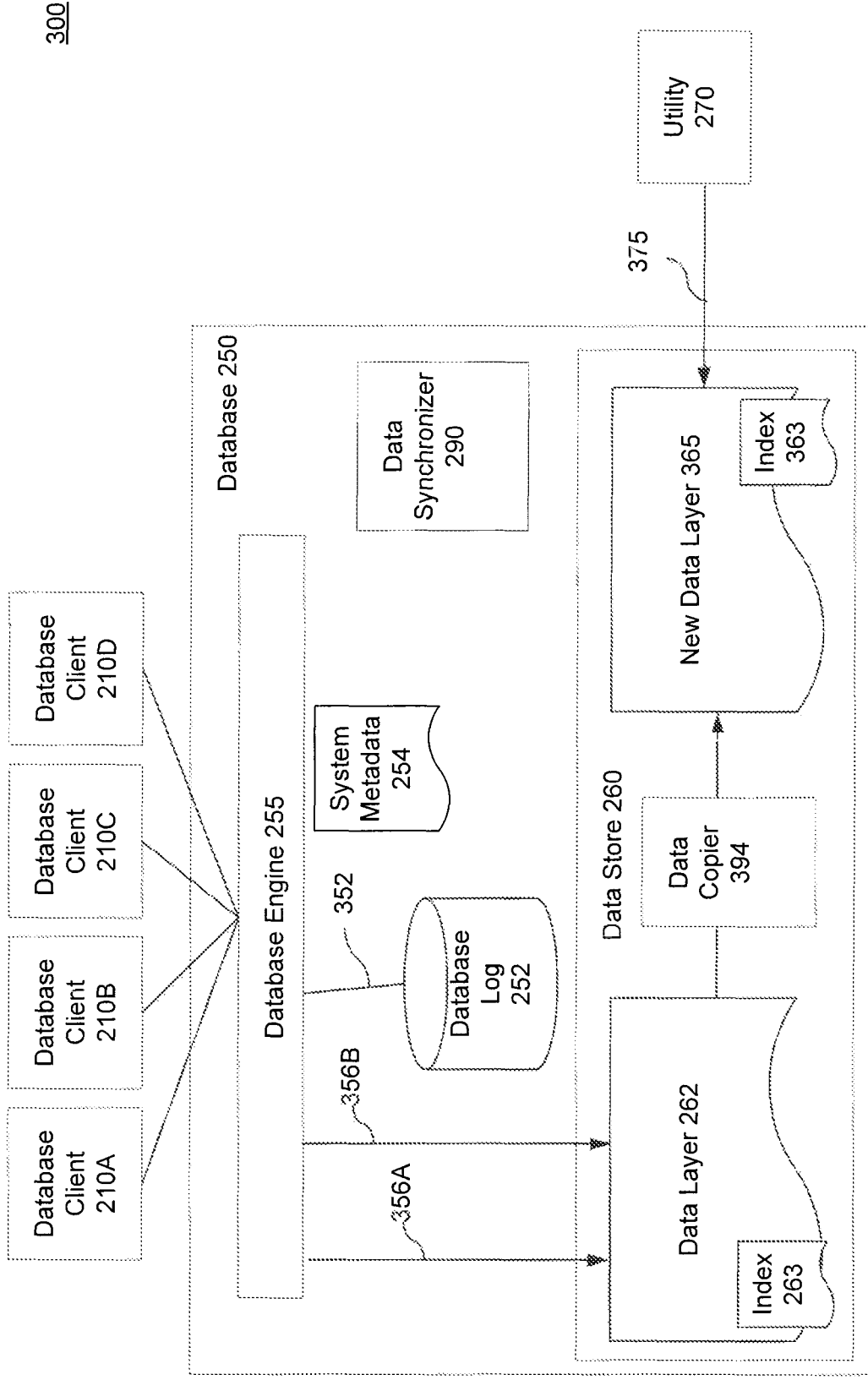
FIG. 3 shows a database system having a data synchronizer and a data copier, according to an embodiment.

FIG. 3 is a block diagram of a database architecture 300, according to an embodiment. Database architecture 300 includes database clients 210A-D, database 250 and utility 270. Database 250 includes database engine 255, data synchronizer 290, database log 252, system metadata 254 and data store 260. Data store 260 includes data layer 262, new data layer 365 and data copier 394 coupled to both data layers. Data layer 262 has database index 263. Utility 270 is shown performing utility operations 375 to new data layer 365. Database engine 255 is shown making modifications 356A-B to data layer 262, and log entries 352 are shown adding to database log 252.

In an embodiment, during phase 2 (184), data is copied from data layer 262 into new data layer 365 using data copier 394. Concurrent to this copying, modifications 356A-B are made to data layer 262 by commands from database clients 210A-D. Each modification 356A and B are added 352 to the first portion of database log 252. As would be appreciated by one having skill in the relevant art(s), given the description herein, these modifications can be performed by multiple threads spawned from a utility. Using this approach, each spawned thread copies independent portions of data layer 262.

As noted above with the description of FIG. 2, a timestamp tracker table can be created that links a timestamp to a database page. In an embodiment, while data is copied from data layer 262 into new data layer 365 using data copier 394, the timestamp tracker table is populated with the corresponding page number and page timestamp of the populated data.

During this copying phase, utility 270 will perform a variety of utility operations 375 on the data stored in new data layer 365. For example, index 363 can be built on new data layer 365 as the data from data layer 262 is stored in new data layer 365.

It is important to note that, in an embodiment, for new data layer 365, during both the copying of data by data copier 394 and the utility operations 375 performed by utility 270, database automation features (e.g., triggers, referential integrity blocks) are disabled for the objects in new data layer 365. Thus, when a record is copied from data layer 262 to new data layer 365, any triggers that would normally be executed by this event are not executed.

Similarly, as data copier 394 copies data from data layer 262 to new data layer 365, data copier 394 does not trigger database automation in data layer 262. In contrast, database clients 210A-D modifications 356A-B continue to trigger database automation features.

It is also important to note that, from the creation of new data structure 265 in phase one, new data layer 365 is not visible to database 250 functions unrelated to data synchronizer 290 and utility 270. While data layer 262 is modified 356A-B during this phase, new data layer 365 is not visible to database clients 210A-D via database engine 255.

In an embodiment, this data copying phase continues until all of the data is copied from data layer 262 to new data layer 365, and utility 270 has performed required utility functions on the data in new data layer 365. Additional utility functions are also performed, such as the creation of index 363 (the counterpart of database index 263 from data layer 262).

Examples of utility functions that can be performed by an embodiment of utility 170 include the following list U1-U4 below:

U1. Reorganizing/Re-indexing huge volumes of data
U2. Reorg Rebuild
U3. Create Clustered Index
U4. Alter table add/drop/modify non-NULL columns (AMC)

One having skill in the relevant art(s), given the description herein, will appreciate other types of database utility functions that can benefit from the approaches described herein.

The duration of this phase 2 (184) depends upon the amount of data in data layer 262, and the utility operations 375 performed by utility 270. It is important to note that, during this entire phase, database clients 210A-D are performing concurrent activity (modifications 356A-B on data layer 262), and the marked first portion of database log 252 is being correspondingly updated.

Third Phase: Logical Synchronization

This two-part phase (186, 188) synchronizes (also termed "updates") the new data layer with changes made to the old data layer 262 during previous phases. This logical synchronization phase has two sub-phases: a non-blocking logical synchronization sub-phase 186, and a blocking logical synchronization sub-phase 188. The duration of each sub-phase depends on the amount of changes made to data layer 262 (termed "concurrent activity") performed in the previous phases of embodiments.

First Sub-Phase: Non-Blocking Logical Synchronization

Figure 4:
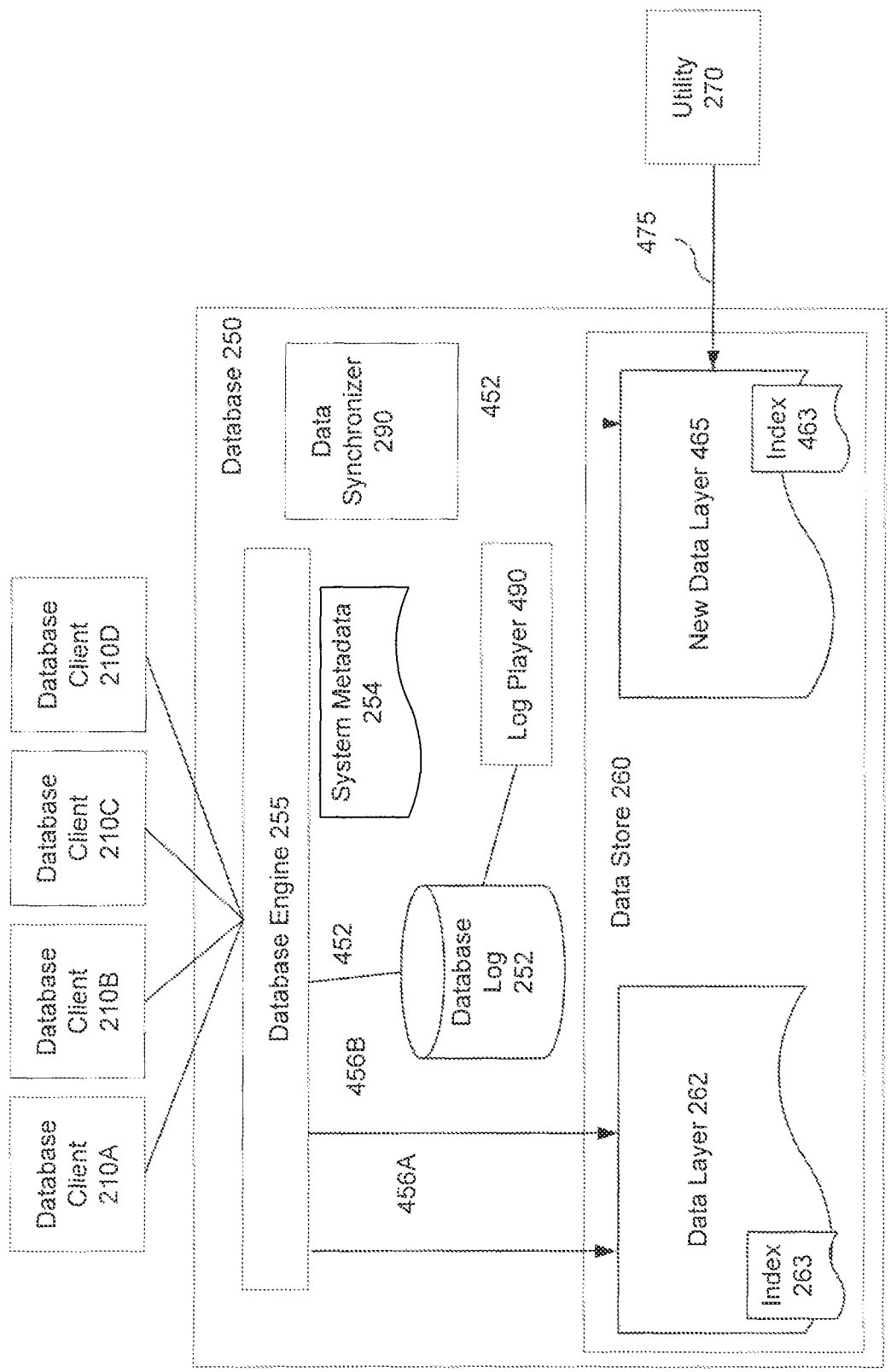
FIG. 4 shows a database system having a data synchronizer and a log player, according to an embodiment.

FIG. 4 is a block diagram of a database architecture 400, according to an embodiment. Database architecture 400 includes database clients 210A-D, database 250 and utility 270. Database 250 includes database engine 255, data synchronizer 290, database log 252, system metadata 254 and data store 260. Data store 260 includes data layer 262 and new data layer 465. Data layer 262 has database index 263. Utility 270 is shown making modification 475 to new data layer 365. Database engine 255 is shown making modifications 456A-B to data layer 262, and log entries 452 are shown adding to database log 252. Log player 490 is coupled to database log 252. New data layer 465 has index 463.

This first sub-phase synchronizes new data layer 465 with the concurrent activity done during the second phase 184 (the data copy phase), as stored in the marked first portion of database log 252. To synchronize the concurrent changes made by database clients 210A-D during the second phase 184, a data updater component, e.g., log player 490, extracts information describing the previous concurrent activity from database log 252 and applies it to new data layer 465. Generally speaking, data copier 394 copies a physically consistent copy of data in the datacopy phase (phase 2) and data updater makes the new data layer transactionally consistent in the logical synchronization phases, phase 3, sub-phases 1 and 2.

As noted above with the description of FIGS. 2 and 3, in an embodiment, a timestamp tracker table is populated with the corresponding page number and page timestamp of the populated data. In this embodiment, log player 490 extracts information describing the previous concurrent activity from database log 252 and, based on the information from the timestamp tracking table (not shown), determines whether to apply the extracted information to the new data layer or not.

During the third phase 186,188, because these log records were generated by changes to data layer 262 but are being applied to new data layer 465, an embodiment terms the synchronization operation "logical" synchronization.

The logical synchronization operation performed in this phase only uses a subset of database log 252 records. As described above, the marked first portion of database log 252 marks the beginning and end of the used portion of database log 252.

It is important to note that, this first sub-phase continues to allow concurrent activity to continue on data layer 262 while log player 490 synchronizes the changes to data layer 262 with new data layer 465. To enable synchronization with this second set of concurrent changes and new data layer 465, an embodiment places another marker in database log 252. This placed marker at the end of the data copy phase, marks a second portion of database log 252. The second sub-phase uses this marker to synchronize the changes made to data layer 262 with new data layer 465. In an embodiment, at the end of phase 3, sub-phase 1 (187), all outstanding transactions in progress using data layer 262 are committed or rolled back.

Second Sub-Phase: Blocking Logical Synchronization

Figure 5:
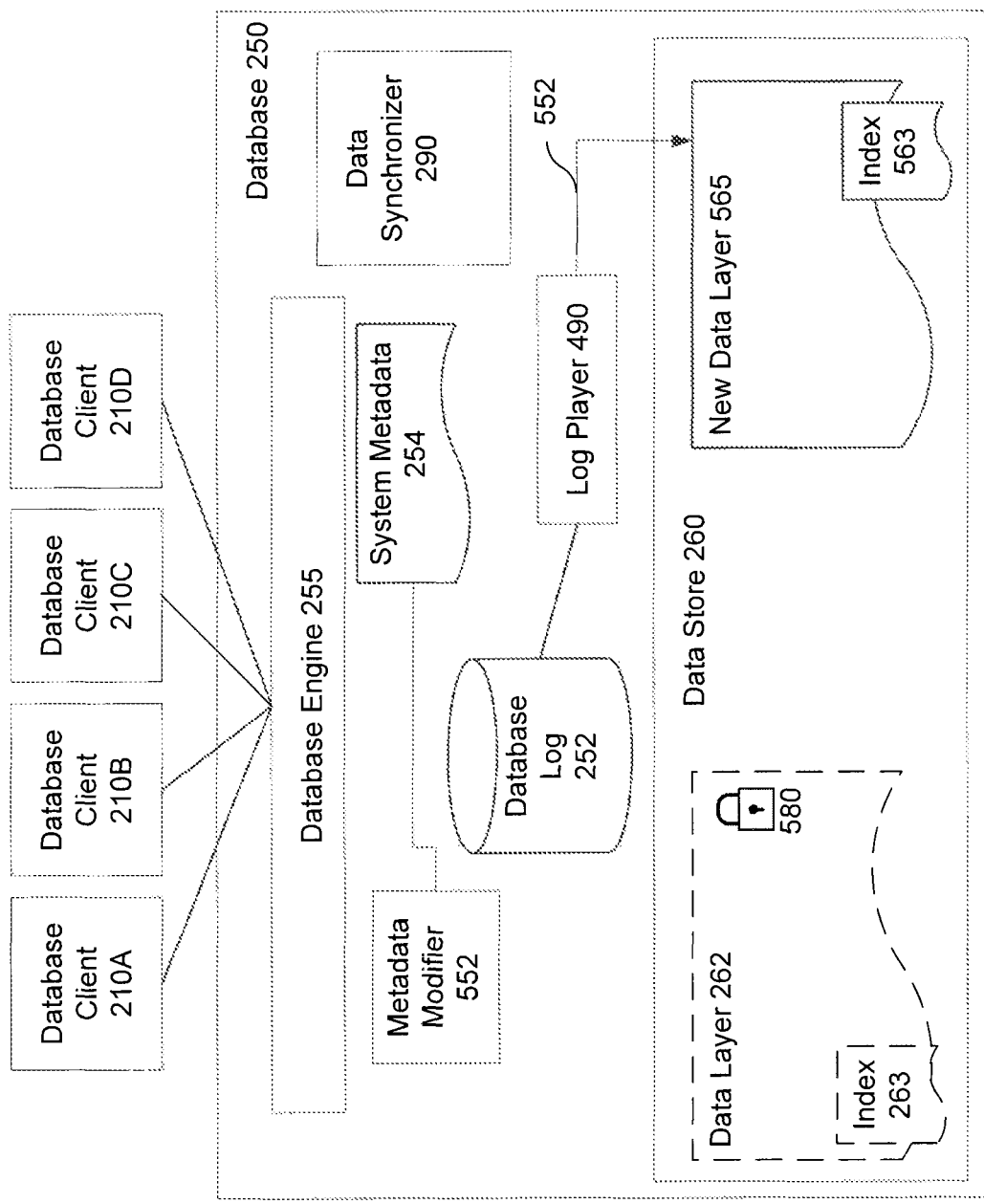
FIG. 5 shows a database system having a data synchronizer, a log player and a locked data layer, according to an embodiment.

FIG. 5 is a block diagram of a database architecture 500, according to an embodiment. Database architecture 500 includes database clients 210A-D, database 250 and utility 270. Database 250 includes database engine 255, data synchronizer 290, database log 252, system metadata 254 and data store 260. Data store 260 includes data layer 262 and new data layer 465. Data layer 262 has database index 263, and is subject to database lock 580. Log player 490 is coupled to database log 252, and is shown modifying 552 new data layer 565. New data layer 565 has index 563.

In an embodiment of database 250, system metadata 254 controls which data sources are used to serve different database applications. For example, when database client 210C connects to database 250 to use the e-commerce application, database engine 255 references system metadata 254 to determine the location of required data sources.

After the second portion of database log 252 has been applied to new data layer 565, data synchronizer 290 directs metadata modifier 552 to change system metadata 254 to change the data source for the example e-commerce application. After these changes, when database client 210C connects to database engine 255, new data layer 565 is used instead of data layer 262. This metadata change is one way of deactivating data layer 262 and activating new data layer 565, as a data source for database engine 255. Interval 193 on FIG. 1B shows the amount of time used to modify system metadata to enable control by new data layer 194.

Once outstanding transactions have been committed or rolled back, the second sub-phase of phase 3 begins 189. This phase 188 synchronizes new data layer 465 with the concurrent activity occurring while the first sub-phase 186 was underway. Unlike the first sub-phase 186, a non-blocking phase, this second sub-phase 188 takes exclusive access 199 to data layer 262, and hence allows no concurrent activity on the data layer while in the sub-phase is completing.

This sub-phase begins at 189, according to an embodiment, by placing database lock 580 on the data layer 262. This second sub-phase 188 in phase three updates new data layer 565 with concurrent activity that occurred during the first sub-phase, as stored in the marked second portion of database log 252. Similar to the process in the first sub-phase, to synchronize the concurrent changes made by database clients 210A-D during the first-sub phase, log player 490, extracts information describing the concurrent activity from database log 252 and applies it to new data layer 565.

Figure 6:
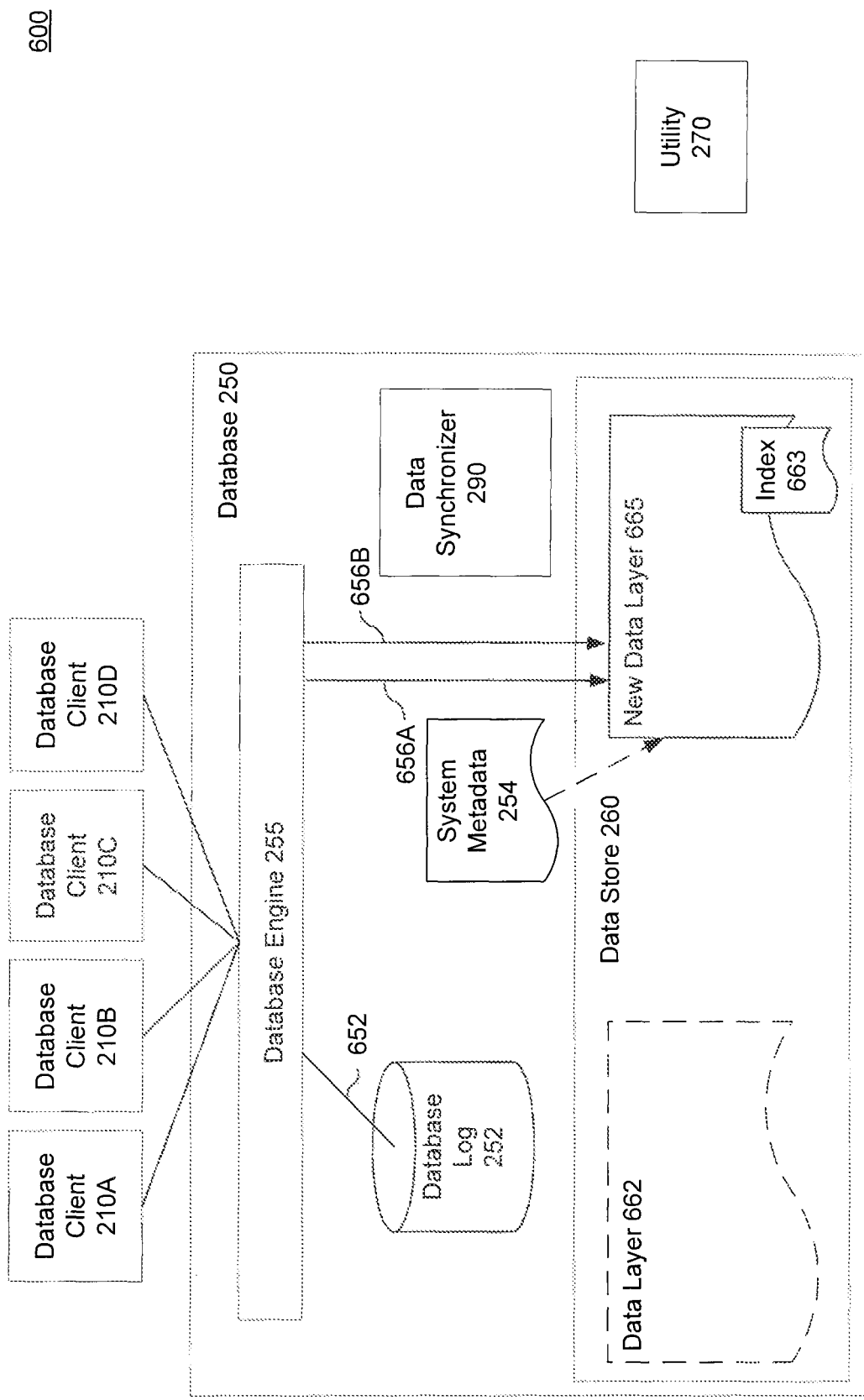
FIG. 6 shows a database system having a data synchronizer, and a connected new data layer, according to an embodiment.

FIG. 6 is a block diagram of a database architecture 600, according to an embodiment. Database architecture 600 includes database clients 210A-D, database 250 and utility 270. Database 250 includes database engine 255, data synchronizer 290, database log 252, system metadata 254, metadata modifier 652 and data store 260. Data store 260 includes inactivated data layer 662 and new data layer 665. New data layer 565 has index 663.

System metadata 254 is shown as related to new data layer 665. As noted above, data synchronizer 290 directed metadata modifier 552 to change system metadata 254 to change the data source for the example e-commerce application. System metadata 254 now directs database engine 255 to new data layer 665. As noted above, this metadata change is one way of deactivating data layer 262 and activating new data layer 565, as a data source for database engine 255.

After phase three has completed 190, updates have been made to new data layer 665 that include all changes to the old data layer that occurred during the three phases. In addition, utility 270 has been able to perform utility functions upon the new data layer. Using this activated new database layer 665, database engine 255 is shown making modifications 656A-B for clients 210A-D.

FIG. 7 is a block diagram of a distributed database system 750 having shared data store 760. Distributed database system 750 has nodes 710A-C sharing shared data store 760. Each respective node 710A-C includes database engine 755A-C and data availability maintainer 770A-C. Data availability maintainer 770A-C performs the functions of, and includes a combination of one or more of the components described with FIGS. 1A-6 above, e.g., data synchronizer 290, log player 490, metadata modifier 552 and data copier 394.

In an embodiment, having a respective data availability maintainer 770A-C for each node 710A-C allows the operation of a utility on any node to be transparent to other nodes in distributed database system 750.

For example, a utility operating on a table accessed by all three nodes 710A-C can be processed using an embodiment, by node 710A while staying online for nodes 710B-C for a longer period of time. Having data availability maintainer 770A use the multiphase approach described in FIG. 1B allows the processed table to stay online to nodes 710B-C except for offline periods 195A-B as shown in FIG. 2B.

Method 800

This section and FIG. 8 summarize one of the techniques described herein by presenting a flowchart of an exemplary method 800 of providing access to a database data source during database maintenance. While method 800 is described with respect to an embodiment of the present invention, method 800 is not meant to be limiting and may be used in other applications.

As shown in FIG. 8, an embodiment of method 800 begins at stage 810 where maintenance of the database data source is initiated. In an embodiment shown in FIG. 2, a data store, for example, data store 260 is maintained by a maintenance utility, for example, utility 270. Once stage 810 is complete, method 800 proceeds to stage 820.

In stage 820, the database maintenance is managed to allow concurrent access to the database data source. In an embodiment shown in FIG. 1B, the maintenance by utility 270 is managed to allow concurrent access to the database data source, for example, in phases: phase 1 (182), phase 2 (184), phase 3, subphase 1 (186) and phase 3, subphase 2 (188). Once stage 820 is complete, method 800 ends.

EXAMPLE COMPUTER EMBODIMENT

Figure 9:
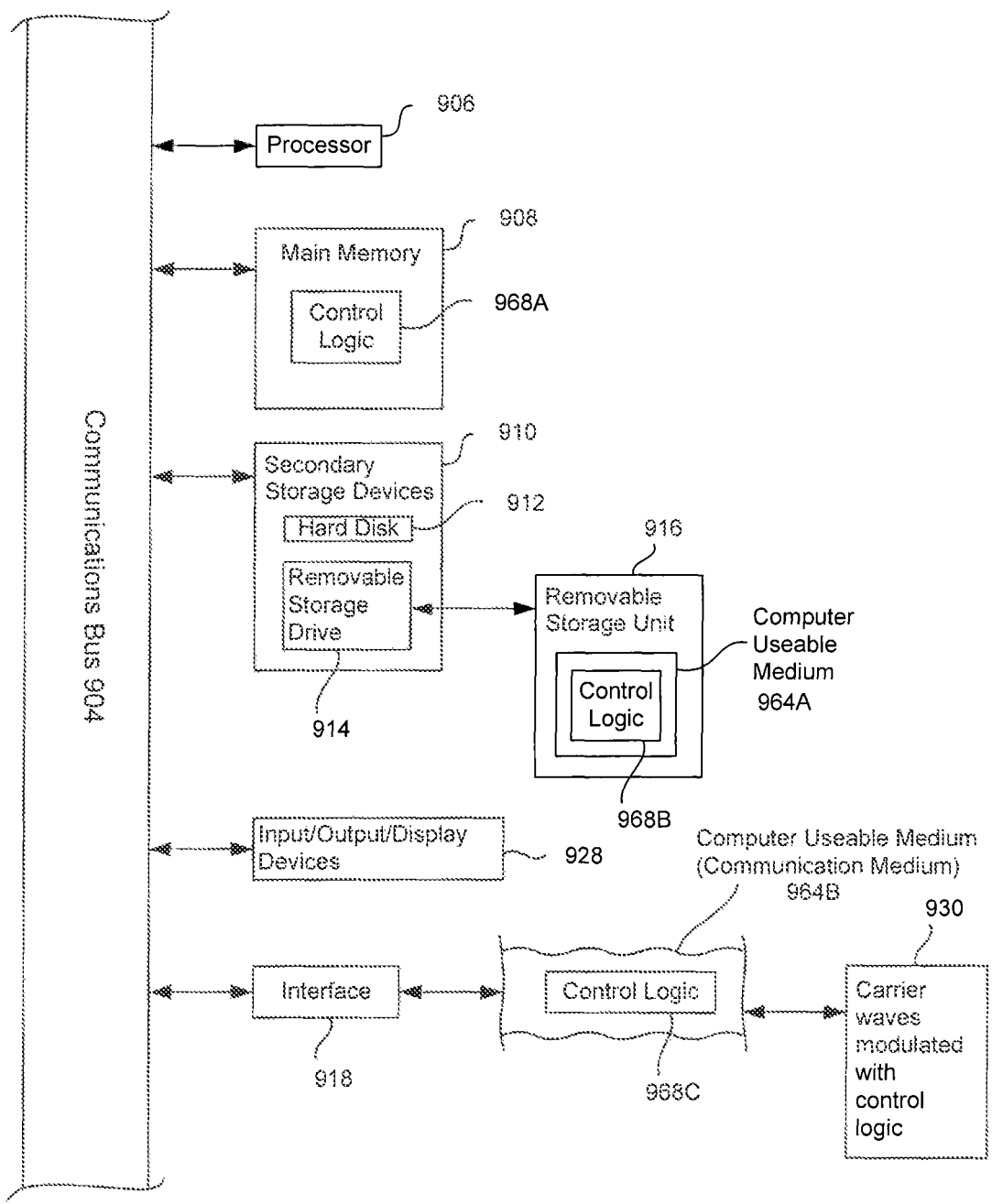
FIG. 9 illustrates an example computer system, useful for implementing components of embodiments described herein, according to an embodiment of the present invention.

In FIG. 9, the system and components of embodiments described herein are implemented using well-known computers. For example, all of the components in FIGS. 1A and 2-6, and the operation of the flowchart in FIG. 7 described above, can be implemented using computer(s) 902.

Computer 902 can be any commercially available and well known computer capable of performing the functions described herein, such as computers available from International Business Machines, Apple, Sun, HP, Dell, Compaq, Digital, Cray, etc.

The computer 902 includes one or more processors (also called central processing units, or CPUs), such as a processor 906. The processor 906 is connected to a communication bus 904. The computer 902 also includes a main or main memory 908, such as random access memory (RAM). The main memory 908 has stored therein control logic 968A (computer software), and data.

The computer 902 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 968B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well-known manner.

The computer 902 also includes input/output/display devices 928, such as monitors, keyboards, pointing devices, etc.

The computer 902 further includes a communication or network interface 918. The network interface 918 enables the computer 902 to communicate with remote devices. For example, the network interface 918 allows the computer 902 to communicate over communication networks or communication medium 964B (representing a form of a computer useable or readable medium), such as LANs, WANs, the Internet, etc. The network interface 918 may interface with remote sites or networks via wired or wireless connections.

Control logic 968C may be transmitted to and from the computer 902 via the communication medium 964B. More particularly, the computer 902 may receive and transmit carrier waves (electromagnetic signals) modulated with control logic 930 via the communication medium 964B.

Any apparatus or manufacture comprising a computer useable or readable medium 964 having control logic (software) 968B stored therein is referred to herein as a computer program product or program storage device (which are articles of manufacture). This includes, but is not limited to, the computer 902, the main memory 908, secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

Embodiments described herein provide methods and systems for providing access to a database data source during database maintenance. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of providing access to a database data source during database maintenance, comprising:
    determining a first data structure including a first set of data that is unlocked and modifiable by one or more clients accessing the first data structure;
    receiving an update to a schema of the first data structure;
    initiating a first locking of the first data structure;
    generating a schema of a second data structure including the schema of the first data structure and the update during the first locking, wherein the second data structure includes an empty data set;
    unlocking the first data structure from the first locking;
    copying the first set of data from the first data structure to the second data structure, wherein the first set of data on the first data structure is unlocked and modifiable by the one or more clients during the copying;
    rebuilding one or more indexes associated with the first set of data, in the second data structure;
    initiating a second locking of the first data structure and the second data structure upon a determination that the second data structure includes the first set of data;
    updating one or more system metadata references directed to the first data structure to direct to the second data structure during the second locking, wherein the updating deactivates the first data structure and activates the second data structure; and
    unlocking the second data structure from the second locking, wherein the first set of data is unlocked and modifiable by the one or more clients on the second data structure.

2. The method of claim 1, further comprising:
    receiving a first modification to the first set of data during the copying.

3. The method of claim 2, further comprising:
    updating the first set of data in the first data structure and a first portion of a database log based on the first modification.

4. The method of claim 3, wherein the copying comprises:
    updating the first set of data based on a timestamp tracker, wherein the timestamp tracker contains a timestamp reference to the first modification.

5. The method of claim 3, wherein the generating further comprises:
    placing a marker in the database log indicating a beginning of a first portion of the database log.

6. The method of claim 1, further comprising:
    determining that the first set of data of the first data structure is subject to an exclusive lock.

7. The method of claim 6, further comprising:
    updating the first set of data in the second data structure while the first set of data is subject to the exclusive lock.

8. The method of claim 1, wherein during the first locking and the second locking, changes to the first data structure are blocked.

9. The method of claim 1, wherein the system metadata is stored separately from both the first data structure and the second data structure.

10. The method of claim 9, wherein the system metadata indicates a location of one or more data sources associated with a particular application, and wherein the updating the one or more references comprises changing the location of the one or more data sources from the first data structure to the second data structure.

11. A system, comprising:

a data source; and at least one processor coupled to the memory and configured to:

determine a first data structure including a first set of data that is unlocked and modifiable by one or more clients accessing the first data structure;

receive an update to a schema of the first data structure;

initiate a first locking of the first data structure;

generate a schema of a second data structure including the schema of the first data structure and the update during the first locking, wherein the second data structure includes an empty data set;

unlock the first data structure from the first locking;

copy the first set of data from the first data structure to the second data structure, wherein the first set of data on the first data structure is unlocked and modifiable by the one or more clients during the copying;

rebuild one or more indexes associated with the first set of data, in the second data structure;

initiate a second locking of the first data structure and the second data structure upon a determination that the second data structure includes the first set of data;

update one or more system metadata references directed to the first data structure to direct to the second data structure during the second locking, wherein the updating deactivates the first data structure and activates the second data structure; and unlock the second data structure from the second locking, wherein the first set of data is unlocked and modifiable by the one or more clients on the second data structure.

12. The system of claim 11, wherein the one or more processors are further configured to:

receive a first modification to the first set of data during the copying; and update the first set of data in the first data structure and a first portion of a database log based on the first modification.

13. The system of claim 11, wherein the one or more processors are further configured to update the first set of data of the second data structure based on one or more modifications received after the unlocking from the second locking.

14. A non-transitory computer-readable medium having computer-executable instructions stored thereon that, when executed by a computing device, cause the computing device to perform a method of providing access to a database data source during database maintenance, the method comprising:

determining a first data structure including a first set of data that is unlocked and modifiable by one or more clients accessing the first data structure;

receiving an update to a schema of the first data structure;

initiating a first locking of the first data structure;

generating a schema of a second data structure including the schema of the first data structure and the update during the first locking, wherein the second data structure includes an empty data set;

unlocking the first data structure from the first locking;

copying the first set of data from the first data structure to the second data structure, wherein the first set of data on the first data structure is unlocked and modifiable by the one or more clients during the copying;

rebuilding one or more indexes associated with the first set of data, in the second data structure;

initiating a second locking of the first data structure and the second data structure upon a determination that the second data structure includes the first set of data;

updating one or more system metadata references directed to the first data structure to direct to the second data structure during the second locking, wherein the updating deactivates the first data structure and activates the second data structure; and unlocking the second data structure from the second locking, wherein the first set of data is unlocked and modifiable by the one or more clients on the second data structure.

\* \* \* \* \*